United States Patent
Hozumi et al.

(10) Patent No.: US 11,916,230 B2
(45) Date of Patent: Feb. 27, 2024

(54) NEGATIVE ELECTRODE ACTIVE MATERIAL, NEGATIVE ELECTRODE, ALKALINE STORAGE BATTERY, AND METHOD OF PRODUCING NEGATIVE ELECTRODE ACTIVE MATERIAL

(71) Applicants: TOYOTA JIDOSHA KABUSHIKI KAISHA, Toyota (JP); KABUSHIKI KAISHA TOYOTA JIDOSHOKKI, Kariya (JP)

(72) Inventors: Masato Hozumi, Mishima (JP); Motoyoshi Okumura, Nagoya (JP); Takeo Okanishi, Kariya (JP); Atsushi Minagata, Kariya (JP)

(73) Assignees: TOYOTA JIDOSHA KABUSHIKI KAISHA, Toyota (JP); KABUSHIKI KAISHA TOYOTA JIDOSHOKKI, Kariya (JP)

(*) Notice: Subject to any disclaimer, the term of this patent is extended or adjusted under 35 U.S.C. 154(b) by 467 days.

(21) Appl. No.: 16/688,241

(22) Filed: Nov. 19, 2019

(65) Prior Publication Data
US 2020/0185710 A1  Jun. 11, 2020

(30) Foreign Application Priority Data

Dec. 6, 2018  (JP) ................. 2018-229017

(51) Int. Cl.
*C22C 19/03* (2006.01)
*H01M 4/38* (2006.01)
(Continued)

(52) U.S. Cl.
CPC ............. *H01M 4/383* (2013.01); *C22C 19/03* (2013.01); *H01M 10/24* (2013.01); *C22C 2202/02* (2013.01); *H01M 2004/027* (2013.01)

(58) Field of Classification Search
CPC .... C22C 19/03; C22C 2202/02; H01M 10/24; H01M 2004/027; H01M 4/38; H01M 4/383; Y02E 60/10; Y02P 70/50
(Continued)

(56) References Cited

U.S. PATENT DOCUMENTS 6,605,387 B1  8/2003  Ueda et al.
8,293,419 B2 * 10/2012  Bandou ............... H01M 10/345
                                              429/218.2
(Continued)

FOREIGN PATENT DOCUMENTS

CN  101027802 A     8/2007
CN  102104146 A  *  6/2011
(Continued)

OTHER PUBLICATIONS

NPL: on-line translation of CN-102104146-A, Jun. 2011 (Year: 2011).*
(Continued)

*Primary Examiner* — Jie Yang
(74) *Attorney, Agent, or Firm* — Sughrue Mion, PLLC

(57) ABSTRACT

A negative electrode active material includes a hydrogen storage alloy. The hydrogen storage alloy has an $A_2B_7$ crystal structure. The hydrogen storage alloy includes nickel. The saturation magnetization per unit mass is 1.9 emu·$g^{-1}$ or more.

2 Claims, 3 Drawing Sheets

(51) Int. Cl.
*H01M 10/24* (2006.01)
*H01M 4/02* (2006.01)

(58) Field of Classification Search
USPC .................................................... 420/455
See application file for complete search history.

(56) References Cited

U.S. PATENT DOCUMENTS

| | | | |
|---|---|---|---|
| 2007/0269717 | A1 | 11/2007 | Bandou et al. |
| 2009/0130551 | A1* | 5/2009 | Mori ................. C01B 3/0047 429/218.2 |
| 2010/0255373 | A1* | 10/2010 | Bandou ............ H01M 10/345 429/218.2 |

FOREIGN PATENT DOCUMENTS

| | | | | |
|---|---|---|---|---|
| CN | 106119652 | A * | 11/2016 | ............ C22C 28/00 |
| CN | 106086569 | B * | 11/2017 | |
| CN | 108149073 | A * | 6/2018 | ............ B22F 1/0003 |
| JP | 2001-135311 | A | 5/2001 | |
| JP | 2002-083593 | A | 3/2002 | |
| JP | 2013-100585 | A | 5/2013 | |
| JP | 2018104811 | A | 7/2018 | |

OTHER PUBLICATIONS

NPL: on-line translation of CN-106119652-A, Nov. 2016 (Year: 2016).*

NPL: on-line translation of CN-108149073-A, Jun. 2018 (Year: 2018).*

NPL: On-line translation of CN 106086569 B, Nov. 2017 (Year: 2017).*

Huiping Yuan et al., "Surface treatment of rare earth-magnesium-nickel based hydrogen storage alloy with lithium hydroxide aqueous solution", International Journal of Hydrogen Energy, vol. 40, No. 13, Feb. 28, 2015, pp. 4623-4629 (7 pages total).

Tiejun Meng et al., "Effects of Alkaline Pre-Etching to Metal Hydride Alloys", Batteries, vol. 3, No. 4, p. 30, Oct. 5, 2017 (13 pages total).

K. Young et al., "Comparisons of metallic clusters imbedded in the surface oxide of $AB_2$, $AB_5$, and $A_2B_7$ alloys", Journal of Alloys and Compounds, vol. 506, 2010, pp. 831-840 (10 pages total).

* cited by examiner

NEGATIVE ELECTRODE ACTIVE MATERIAL, NEGATIVE ELECTRODE, ALKALINE STORAGE BATTERY, AND METHOD OF PRODUCING NEGATIVE ELECTRODE ACTIVE MATERIAL

INCORPORATION BY REFERENCE

The disclosure of Japanese Patent Application No. 2018-229017 filed on Dec. 6, 2018 including the specification, drawings and abstract is incorporated herein by reference in its entirety.

BACKGROUND

1. Technical Field

The present disclosure relates to a negative electrode active material, a negative electrode, an alkaline storage battery, and a method of producing a negative electrode active material.

2. Description of Related Art

Japanese Unexamined Patent Application Publication No. 2001-135311 (JP 2001-135311 A) discloses that an amount of a nickel magnetic substance in an $AB_5$ type hydrogen storage alloy (hereinafter also referred to as an "$AB_5$ alloy") is 1.5 wt % to 5.0 wt %.

SUMMARY

The present disclosure reduces battery resistance.

The technical configuration and actions and effects of the present disclosure will be described below. However, an operation mechanism of the present disclosure includes assumptions. The scope of claims is not limited according to the correctness of this operation mechanism.

[1] A negative electrode active material of the present disclosure includes a hydrogen storage alloy. The hydrogen storage alloy has an $A_2B_7$ crystal structure. The hydrogen storage alloy includes nickel. The saturation magnetization per unit mass of the negative electrode active material is 1.9 emu·g$^{-1}$ or more.

The hydrogen storage alloy of the present disclosure has an $A_2B_7$ crystal structure. Hereinafter, the hydrogen storage alloy having an $A_2B_7$ crystal structure will be referred to as an "$A_2B_7$ alloy." Generally, the $A_2B_7$ alloy is a weak magnetic substance. Inherently, the saturation magnetization per unit mass of the $A_2B_7$ alloy is very small.

The negative electrode active material of the present disclosure has a saturation magnetization per unit mass of 1.9 emu·g$^{-1}$ or more. When the negative electrode active material substantially consists of only an $A_2B_7$ alloy, it can be said that "the saturation magnetization per unit mass of the $A_2B_7$ alloy is 1.9 emu·g$^{-1}$ or more." The magnitude of the saturation magnetization per unit mass is thought to reflect an amount of a ferromagnetic substance component (for example, metallic nickel) contained in the $A_2B_7$ alloy. According to new findings of the present disclosure, when the saturation magnetization per unit mass is 1.9 emu·g$^{-1}$ or more, the battery resistance is expected to be significantly lowered. The magnitude of the saturation magnetization per unit mass can be adjusted, for example, in a method of producing a negative electrode active material to be described below.

[2] The saturation magnetization per unit mass of the negative electrode active material may be 5.8 emu·g$^{-1}$ or less. As the saturation magnetization per unit mass becomes larger, the battery resistance is expected to be lowered. On the other hand, as the saturation magnetization per unit mass becomes larger, the hydrogen storage capacity of the $A_2B_7$ alloy tends to decrease. When the saturation magnetization per unit mass is 5.8 emu·g$^{-1}$ or less, the $A_2B_7$ alloy can have a larger hydrogen storage capacity than an $AB_5$ alloy. The $AB_5$ alloy is a material which has been heretofore widely used as a negative electrode active material for an alkaline storage battery.

[3] A negative electrode of the present disclosure includes the negative electrode active material.

[4] An alkaline storage battery of the present disclosure includes the negative electrode. The alkaline storage battery of the present disclosure is expected to have a low battery resistance.

[5] A method of producing a negative electrode active material of the present disclosure includes the following ($\alpha$) and ($\beta$):

($\alpha$) preparing a hydrogen storage alloy; and ($\beta$) producing a negative electrode active material by heating the hydrogen storage alloy in an alkaline aqueous solution. The hydrogen storage alloy has an $A_2B_7$ crystal structure. The hydrogen storage alloy includes nickel. The saturation magnetization per unit mass of the negative electrode active material is 1.9 emu·g$^{-1}$ or more.

According to the method of producing a negative electrode active material of the present disclosure, the negative electrode active material can be produced. It is thought that, when the hydrogen storage alloy in the alkaline aqueous solution is heated, a ferromagnetic substance component (for example, metallic nickel) is generated on the surface of the hydrogen storage alloy. The ferromagnetic substance component is generated so that the saturation magnetization per unit mass of the negative electrode active material is 1.9 emu·g$^{-1}$ or more. Thereby, the battery resistance is expected to be significantly lowered.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
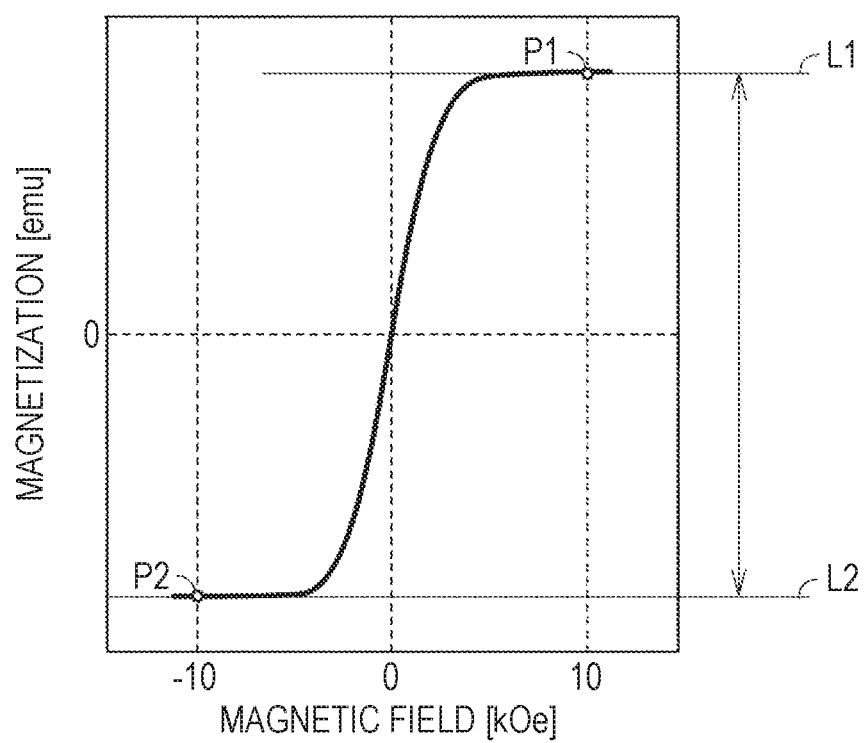
FIG. 1 is a graph illustrating a method of measuring saturation magnetization.

Embodiments (referred to as "the present embodiments" in this specification) of the present disclosure will be described below. However, the following descriptions do not limit the scope of the claims.

<Negative Electrode Active Material>

A negative electrode active material according to the present embodiment contains a hydrogen storage alloy. The negative electrode active material may substantially consist of only a hydrogen storage alloy. The hydrogen storage alloy may be, for example, powder (a particle aggregate). The hydrogen storage alloy may have, for example, a d50 of 1 μm or more and 100 μm or less. "d50" in this specification refers to a particle size at which a cumulative particle volume from the fine particles in the volume-based particle size distribution becomes 50% of the total particle volume. d50 can be measured by, for example, a laser diffraction type particle size distribution measuring device. The hydrogen storage alloy may have, for example, a d50 of 5 μm or more and 50 μm or less.

<<$A_2B_7$ Alloy>>

A hydrogen storage alloy according to the present embodiment has an $A_2B_7$ crystal structure. The hydrogen storage alloy may substantially consist of only an $A_2B_7$ crystal structure. The fact that the hydrogen storage alloy has an $A_2B_7$ crystal structure can be confirmed using a powder X-ray diffraction method. That is, an X-ray diffraction chart of the hydrogen storage alloy is acquired. It can be confirmed whether the hydrogen storage alloy has an $A_2B_7$ crystal structure according to matching the X-ray diffraction chart with a Joint Committee on Powder Diffraction Standards (JCPDS) card.

<<Chemical Composition>>

The hydrogen storage alloy according to the present embodiment contains nickel (Ni). For example, the hydrogen storage alloy may contain 55 mass % or more and 65 mass % or less of Ni. For example, the chemical composition of the hydrogen storage alloy can be measured through inductively coupled plasma (ICP) atomic emission spectroscopy. The chemical composition is measured at least three times. An arithmetic mean of at least three measurements is used.

For example, the hydrogen storage alloy may have a chemical composition represented by the following Formula (I):

$$A_2B_7 \quad (I)$$

[here, in Formula (I), A and B each are a metal element; A includes rare earth elements; and B includes Ni].

The hydrogen storage alloy may be, for example, an RE-Mg—Ni alloy. "RE" represents a rare earth element. For example, the RE-Mg—Ni alloy may have a chemical composition represented by the following Formula (II):

$$A_2B_7 \quad (II)$$

[here, in Formula (II),
A may include, for example, at least one selected from the group consisting of lanthanum (La), cerium (Ce), praseodymium (Pr), neodymium (Nd) and samarium (Sm), and Mg; and
B includes Ni].

In Formula (II), B may further include at least one selected from the group consisting of cobalt (Co) and aluminum (Al) in addition to Ni.

For example, the RE-Mg—Ni alloy may have a chemical composition represented by the following Formula (III):

$$RE_{1-x}Mg_xNi_yAl_z \quad (III)$$

[here, in Formula (III),
RE may include, for example, at least one selected from the group consisting of La, Ce, Pr, Nd and Sm; and x, y and z may satisfy, for example, $0<x<0.3$, $3.3\leq y+z\leq 3.7$, $0\leq z\leq 0.3$].

<<Saturation Magnetization Per Unit Mass>>

The negative electrode active material according to the present embodiment has a saturation magnetization per unit mass of 1.9 emu·g$^{-1}$ or more. The magnitude of the saturation magnetization per unit mass is thought to reflect an amount of a ferromagnetic substance component (for example, metallic nickel) contained in the negative electrode active material (the hydrogen storage alloy when the negative electrode active material substantially consists of only the hydrogen storage alloy). When the saturation magnetization per unit mass is 1.9 emu·g$^{-1}$ or more, the battery resistance is expected to be lowered.

Saturation magnetization is measured by a vibration sample type magnetometer. For example, a vibration sample type magnetometer "VSM" (commercially available from Toei Industry Co., Ltd.) may be used. A magnetometer having the same function as the above magnetometer may be used.

The sample is a powder. When the negative electrode active material is not a powder, the negative electrode active material is appropriately pulverized. An amount of the sample is about 0.2±0.01 g. The sample is filled into a predetermined container. The container may be made of, for example, an acrylic resin. The measurement temperature is room temperature (25±10° C.). The measurement atmosphere is air.

FIG. 1 is a graph illustrating a method of measuring saturation magnetization. The magnetic field is swept in the range of ±11 kOe by a vibration sample type magnetometer. Thereby, a magnetization curve of the negative electrode active material is obtained. On the magnetization curve, a first straight line (L1) is obtained by interpolating the tangent at the first point (P1) at which the magnetic field is 10 kOe. On the magnetization curve, a second straight line (L2) is obtained by interpolating the tangent at the second point (P2) at which the magnetic field is −10 kOe. ½ (half) of the distance between the first straight line (L1) and the second straight line (L2) is set as the saturation magnetization. The "saturation magnetization per unit mass" is calculated by dividing the saturation magnetization by the amount of the sample. The saturation magnetization per unit mass is measured at least three times. An arithmetic mean of at least three measurements is used.

As the saturation magnetization per unit mass increases, the battery resistance is expected to be lowered. The saturation magnetization per unit mass may be, for example, 2.9 emu·g$^{-1}$ or more. The saturation magnetization per unit mass may be, for example, 3.4 emu·g$^{-1}$ or more. The saturation magnetization per unit mass may be, for example, 3.6 emu·g$^{-1}$ or more. The saturation magnetization per unit mass may be, for example, 4.8 emu·g$^{-1}$ or more. The saturation magnetization per unit mass may be, for example, 5.3 emu·g$^{-1}$ or more.

The saturation magnetization per unit mass may be, for example, 5.8 emu·g$^{-1}$ or less. As the saturation magnetization per unit mass increases, the hydrogen storage capacity of the $A_2B_7$ alloy tends to decrease. When the saturation magnetization per unit mass is 5.8 emu·g$^{-1}$ or less, the $A_2B_7$ alloy can have a larger hydrogen storage capacity than an $AB_5$ alloy.

<Method of Producing a Negative Electrode Active Material>

Figure 2:
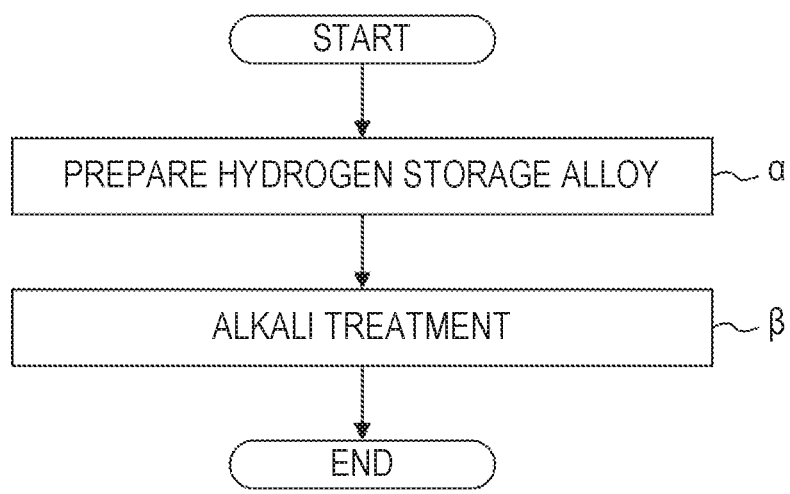
FIG. 2 is a flowchart showing an outline of a method of producing a negative electrode active material according to the present embodiment.

FIG. 2 is a flowchart showing an outline of a method of producing a negative electrode active material according to the present embodiment. The method of producing a negative electrode active material according to the present embodiment includes "(α) preparation of hydrogen storage alloy" and "(β) alkali treatment."

<<(α) Preparation of Hydrogen Storage Alloy>>

The method of producing a negative electrode active material according to the present embodiment includes preparation of a hydrogen storage alloy. The hydrogen storage alloy has an $A_2B_7$ crystal structure. The hydrogen storage alloy includes nickel.

A hydrogen storage alloy may be prepared by purchasing a commercially available $A_2B_7$ alloy. A hydrogen storage alloy may be prepared by producing an $A_2B_7$ alloy.

An $A_2B_7$ alloy can be produced according to various methods. For example, a molten alloy having a predetermined chemical composition may be prepared. When a molten alloy is rapidly cooled by a strip casting method, a slab of the $A_2B_7$ alloy is obtained. The slab is pulverized to obtain an $A_2B_7$ alloy powder. An $A_2B_7$ alloy may be prepared according to, for example, a gas atomization method, a melt spinning method, or the like.

<<(β) Alkali Treatment>>

The method of producing a negative electrode active material according to the present embodiment includes production of a negative electrode active material by heating a hydrogen storage alloy in an alkaline aqueous solution. The saturation magnetization per unit mass of the negative electrode active material is 1.9 emu·g$^{-1}$ or more. That is, an alkali treatment is performed so that the saturation magnetization per unit mass is 1.9 emu·g$^{-1}$ or more.

A predetermined alkaline aqueous solution is prepared. For example, a NaOH (sodium hydroxide) aqueous solution is prepared. The NaOH aqueous solution may have, for example, a concentration of 30 mass % or more and 44 mass % or less.

The NaOH aqueous solution is heated to a predetermined temperature. The temperature of the NaOH aqueous solution is measured by a general thermometer. The NaOH aqueous solution is heated to, for example, a temperature of 90° C. or higher and 110° C. or less. A hydrogen storage alloy powder is immersed in the heated NaOH aqueous solution. In the alkali treatment, the NaOH aqueous solution may be stirred. The treatment time may be, for example, 0.5 hours or longer and 2 hours or shorter.

In the present embodiment, the concentration, temperature and treatment time of the alkaline aqueous solution are combined so that the saturation magnetization per unit mass of the negative electrode active material is 1.9 emu·g$^{-1}$ or more.

It is thought that a ferromagnetic substance component (for example, metallic nickel) is generated in the hydrogen storage alloy according to the alkali treatment. For example, a metallic nickel layer may be formed on the surface of the hydrogen storage alloy. Accordingly, the negative electrode active material is produced. After the alkali treatment, the negative electrode active material may be washed with water. After washing with water, the negative electrode active material may be dried.

<Alkaline Storage Battery>

Figure 3:
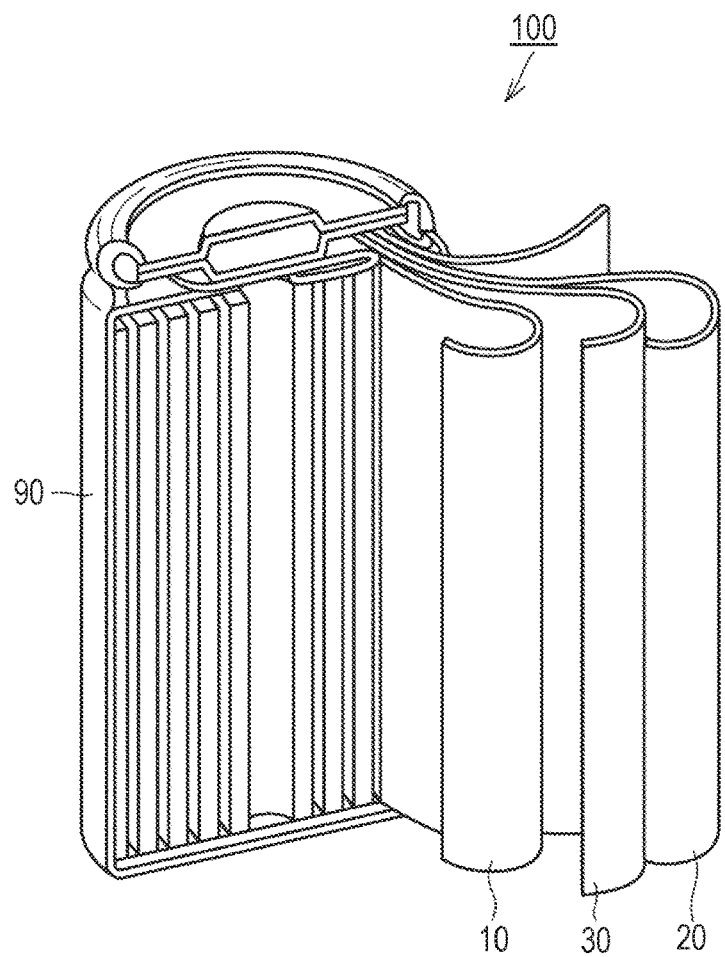
FIG. 3 is a schematic view showing an example of a configuration of an alkaline storage battery according to the present embodiment.

FIG. 3 is a schematic view showing an example of a configuration of an alkaline storage battery according to the present embodiment. A battery 100 is an alkaline storage battery. The "alkaline storage battery" in this specification refers to a secondary battery in which an alkaline aqueous solution is used as an electrolyte solution. The alkaline storage battery may be, for example, a nickel hydride battery.

<<Exterior Member>>

The battery 100 includes an exterior member 90. The exterior member 90 can be formed of, for example, a metal material or a polymer material. The exterior member 90 is cylindrical. Alternatively, the exterior member 90 may be rectangular. In the exterior member 90, a positive electrode 10, a separator 30, a negative electrode 20 and an alkaline aqueous solution are stored. That is, the battery 100 includes the negative electrode 20.

<<Negative Electrode>>

The negative electrode 20 is a sheet-like component. The negative electrode 20 includes the negative electrode active material of the present embodiment. Details of the negative electrode active material according to the present embodiment are as described above. When the negative electrode 20 includes the negative electrode active material of the present embodiment, the battery 100 is expected to have a low battery resistance.

The negative electrode 20 may substantially consist of only the negative electrode active material. For example, the negative electrode 20 may be a molded article of a hydrogen storage alloy. As long as the negative electrode 20 includes a negative electrode active material, the negative electrode 20 may further include, for example, a current collector and a binder, in addition to the negative electrode active material. For example, the negative electrode 20 may be formed by applying a negative electrode mixture containing a negative electrode active material and a binder to a current collector.

The current collector is a conductive electrode substrate. The current collector is not particularly limited. The current collector may be, for example, a metal foil, a punching metal, or a porous metal component. The metal foil may be, for example, a Ni foil or a Ni-plated steel foil. The metal foil may have, for example, a thickness of 5 μm or more and 50 μm or less. Regarding the porous metal component, for example, "Celmet" (registered trademark, commercially available from Sumitomo Electric Industries, Ltd) may be considered.

The binder is not particularly limited. For example, the binder may include at least one selected from the group consisting of styrene butadiene rubber (SBR), polytetrafluoroethylene (PTFE) and carboxymethylcellulose (CMC). For example, 0.1 parts by mass or more and 10 parts by mass or less of the binder may be included with respect to 100 parts by mass of the negative electrode active material.

<<Positive Electrode>>

The positive electrode 10 is a sheet-like component. The positive electrode 10 includes a positive electrode active material. The positive electrode active material may include, for example, Ni(OH)$_2$ (nickel hydroxide). The positive electrode 10 may further include, for example, a current collector, a conductive material and a binder in addition to the positive electrode active material. The current collector is not particularly limited. For example, the material exemplified as the current collector of the negative electrode 20 can also be used for the positive electrode 10. The binder is not particularly limited. For example, the material exemplified as the binder of the negative electrode 20 can also be used for the positive electrode 10.

The conductive material is not particularly limited. The conductive material may be, for example, Co(OH)$_2$ (cobalt hydroxide), or CoO (cobalt oxide). For example, the conductive material may cover the surface of the positive electrode active material.

<<Separator>>

The separator 30 is disposed between the positive electrode 10 and the negative electrode 20. The separator 30 has an electrically insulating property. The separator 30 includes a porous film. The separator 30 may have, for example, a thickness of 50 μm or more and 150 μm or less. The separator 30 may include, for example, a polyolefin non-woven fabric or a polyamide non-woven fabric.

<<Alkaline Aqueous Solution>>

An alkaline aqueous solution is impregnated into the positive electrode 10, the negative electrode 20, and the separator 30. The alkaline aqueous solution contains water and an alkali metal hydroxide. The alkaline aqueous solution may contain, for example, 1 mol/L or more and 20 mol/L or less of the alkali metal hydroxide. For example, the alkali metal hydroxide may contain at least one selected from the group consisting of KOH (potassium hydroxide), NaOH and LiOH (lithium hydroxide).

Examples (referred to as "present examples" in this specification) of the present disclosure will be described below. However, the following descriptions do not limit the scope of the claims.

Production of Negative Electrode Active Material

Example 1

1. (α) Preparation of Hydrogen Storage Alloy

A RE-Mg—Ni alloy (RE=La) powder was prepared. The alloy had an $A_2B_7$ crystal structure.

2. (β) Alkali Treatment

A NaOH aqueous solution was prepared. The concentration of the NaOH aqueous solution was 30 mass %. The NaOH aqueous solution was heated to 90° C. A hydrogen storage alloy powder was immersed in the heated NaOH aqueous solution for about 1 hour. Thereby, a negative electrode active material was produced. The negative electrode active material was washed with water and dried. After drying, the "saturation magnetization per unit mass" was measured by the above method. The results are shown in the following Table 1.

3. Production of Alkaline Storage Battery (Refer to FIG. 3)

Here, 100 parts by mass of the negative electrode active material, 1 part by mass of the binder and water were mixed, and thereby a negative electrode mixture slurry was prepared. The binder contained a synthetic rubber. Regarding the current collector, a Ni foil was prepared. A negative electrode mixture slurry was applied to the surface of the current collector and dried to produce the negative electrode 20.

The positive electrode 10 was prepared. A positive electrode active material contained $Ni(OH)_2$. In addition, the separator 30, the alkaline aqueous solution, and the exterior member 90 were prepared. The battery 100 was produced using these components. The battery 100 of the present example was a nickel hydride battery.

Examples 2 to 7, and Comparative Examples 1 to 3

As shown in the following Table 1, a negative electrode active material was produced in the same manner as in Example 1 except that conditions for "(β) alkali treatment" were changed. A negative electrode containing a negative electrode active material was produced in the same manner as in Example 1. A battery was produced in the same manner as in Example 1. Here, in Comparative Example 1, "(β) alkali treatment" was not performed.

<Measurement of Battery Resistance>

The battery was subjected to an initial charging and discharging cycle under the following conditions.

Charging: current rate=0.1 C, charging time=15 hours
Discharging: current rate=0.2 C, cut-off voltage=1 V "C" is a unit of a current rate. At a current rate of 1 C, the rated capacity of the battery was discharged for 1 hour.

After initial charging and discharging, the battery was subjected to activated charging and discharging under the following conditions.

charging: current rate=0.5 C, charging time=2 hours
discharge: current rate=0.5 C, cut-off voltage=1 V After activated charging and discharging, a state of charge (SOC) of the battery was adjusted to 50%. After the SOC was adjusted, a DC internal resistance (DC-IR) of the battery was measured. The results are shown in the column "battery resistance" in the following Table 1. The values shown in the column "battery resistance" in the following Table 1 were relative values when the value of DC-IR of Comparative Example 1 was set to 100.

TABLE 1

| | Method of producing negative electrode active material | | | | Negative electrode active material Saturation magnetization per unit mass [emu · g$^{-1}$] | Alkaline storage battery Battery resistance [—] |
|---|---|---|---|---|---|---|
| | (α) Preparing hydrogen storage alloy $A_2B_7$ alloy | (β) Alkali treatment | | | | |
| | | NaOH aq [mass %] | Temperature [° C.] | Time [hour] | | |
| Comparative Example 1 | RE-Mg—Ni-based | — | — | — | 0.1 | 100 |
| Comparative Example 2 | RE-Mg—Ni-based | 30 | 80 | 1 | 1.7 | 51 |
| Comparative Example 3 | RE-Mg—Ni-based | 30 | 85 | 1 | 1.8 | 46 |
| Example 1 | RE-Mg—Ni-based | 30 | 90 | 1 | 1.9 | 43 |
| Example 2 | RE-Mg—Ni-based | 40 | 90 | 1 | 2.9 | 43 |
| Example 3 | RE-Mg—Ni-based | 40 | 95 | 1 | 3.4 | 43 |
| Example 4 | RE-Mg—Ni-based | 44 | 95 | 1 | 3.6 | 40 |
| Example 5 | RE-Mg—Ni-based | 44 | 100 | 1 | 4.8 | 40 |
| Example 6 | RE-Mg—Ni-based | 44 | 105 | 1 | 5.3 | 39 |
| Example 7 | RE-Mg—Ni-based | 44 | 110 | 1 | 5.8 | 39 |

<Results>

Figure 4:
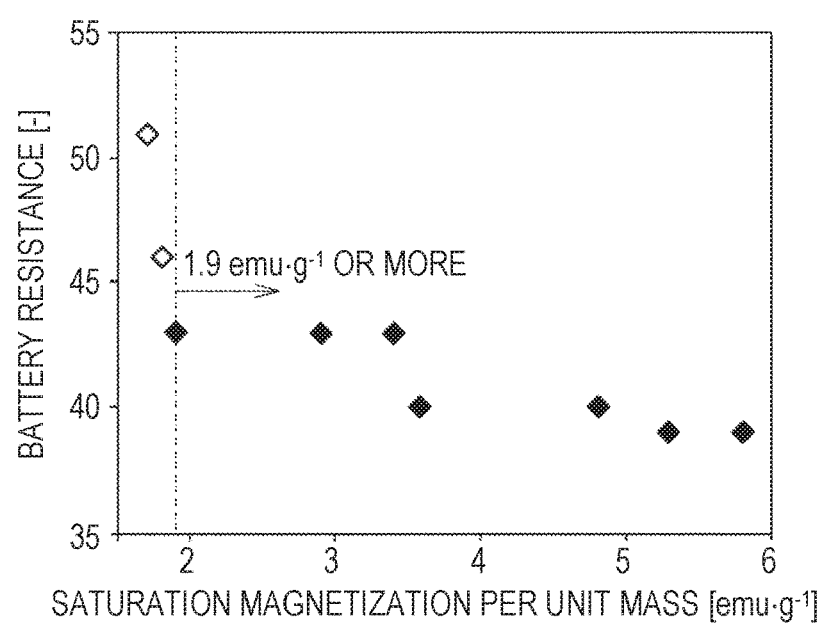
FIG. 4 is a graph showing the relationship between saturation magnetization per unit mass and battery resistance.

FIG. 4 is a graph showing the relationship between saturation magnetization per unit mass and battery resistance. As shown in FIG. 4, when the saturation magnetization per unit mass is 1.9 emu·g$^{-1}$ or more, the battery resistance is significantly lowered. Then, the battery resistance gradually decreases as the saturation magnetization per unit mass increases.

The embodiments and examples of the present disclosure are only examples and should not be considered as restrictive. The technical scope defined by the description of the claims includes meanings equivalent to the scope of the claims and all modifications within the scope of the claims.

What is claimed is:

1. A method of producing an alkaline storage battery, comprising:
    preparing a hydrogen storage alloy;
    producing a negative electrode active material by heating the hydrogen storage alloy in an NaOH aqueous solution having a concentration of 44 mass % at a temperature of 105° C. or higher and 110° C. or less for an hour, and
    preparing a negative electrode with the negative electrode active material,
    wherein the hydrogen storage alloy has a chemical composition represented by the following
    Formula (II): $A_2B_7$ (II)
    where A includes La and Mg; and B includes Ni,
    wherein the hydrogen storage alloy includes cobalt and 55 mass % or more and 65 mass % or less of nickel,
    wherein a saturation magnetization per unit mass of the negative electrode active material is 5.3 emu·g$^{-1}$ to 5.8 emu·g$^{-1}$, and
    wherein a direct current internal resistance of the alkaline storage battery is less than 40 with respect to a direct current internal resistance of a second alkaline storage battery including a negative electrode active material having a saturation magnetization per unit mass is 0.1 emu g$^{-1}$ when a state of charge (SOC) of the first and second alkaline storage batteries is 50%.

2. An alkaline storage battery comprising a negative electrode comprising a negative electrode active material,
    the negative electrode active material, comprising:
    a hydrogen storage alloy,
    wherein the hydrogen storage alloy has a chemical composition represented by the following
    Formula (II): $A_2B_7$ (II)
    where A includes La and Mg; and B includes Ni,
    wherein the hydrogen storage alloy includes cobalt and 55 mass % or more and 65 mass % or less of nickel, and
    wherein a saturation magnetization per unit mass of the negative electrode active material is 5.3 emu·g$^{-1}$ to 5.8 emu·g$^{-1}$,
    wherein a direct current internal resistance of the alkaline storage battery is less than 40 with respect to a direct current internal resistance of a second alkaline storage battery including a negative electrode active material having a saturation magnetization per unit mass is 0.1 emu g$^{-1}$ when a state of charge (SOC) of the first and second alkaline storage batteries is 50%.

* * * * *